United States Patent
Li et al.

(10) Patent No.: US 12,483,124 B2
(45) Date of Patent: Nov. 25, 2025

(54) BUCK CONVERTER WITH HIGH POWER EFFICIENCY

(71) Applicant: MEDIATEK INC., Hsinchu (TW)

(72) Inventors: Chih-Chen Li, Hsinchu (TW); Jin-Yan Syu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 631 days.

(21) Appl. No.: 17/821,215

(22) Filed: Aug. 22, 2022

(65) Prior Publication Data
US 2023/0163685 A1 May 25, 2023

Related U.S. Application Data

(60) Provisional application No. 63/282,209, filed on Nov. 23, 2021.

(51) Int. Cl.
*H02M 3/07* (2006.01)
*H02M 1/00* (2006.01)

(52) U.S. Cl.
CPC ........... *H02M 3/07* (2013.01); *H02M 1/0095* (2021.05)

(58) Field of Classification Search
CPC ........ H02M 3/07; H02M 3/071; H02M 3/072; H02M 3/073; H02M 3/077; H02M 7/4837; H02M 7/4835; H02M 7/4833; H02M 1/0095
See application file for complete search history.

(56) References Cited

U.S. PATENT DOCUMENTS

| | | | |
|---|---|---|---|
| 9,178,422 B2 | 11/2015 | Dash et al. | |
| 10,615,692 B2 | 4/2020 | Khayat et al. | |
| 11,612,031 B2 | 3/2023 | Song | |
| 2007/0229047 A1 | 10/2007 | Sigamani et al. | |
| 2018/0054121 A1* | 2/2018 | Chen | H02M 1/08 |
| 2021/0336541 A1* | 10/2021 | Xie | H02M 3/07 |
| 2023/0223844 A1* | 7/2023 | Yang | H02M 3/1584 363/60 |

FOREIGN PATENT DOCUMENTS

| | | |
|---|---|---|
| TW | 201611494 A | 3/2016 |
| TW | 202002450 A | 1/2020 |
| TW | 202044924 A | 12/2020 |

OTHER PUBLICATIONS

Shenoy, P., et al.; "A 5 MHz, 12 V, 10 A, Monolithically Integrated Two-Phase Series Capacitor Buck Converter;" IDDD; Mar. 2016; pp. 66-72.
Chinese language office action dated Mar. 3, 2023, issued in application No. TW 111135333.
Extended European Search Report dated Mar. 23, 2023, issued in application No. EP 22208781.9.

* cited by examiner

*Primary Examiner* — Nguyen Tran

(74) *Attorney, Agent, or Firm* — McClure, Qualey & Rodack, LLP

(57) ABSTRACT

A buck converter with high power efficiency is shown, which converts an input voltage to an output voltage. The buck converter has an inductor, a voltage shift component, and a discharging branch. The inductor is charged and discharged to regulate the output voltage. The voltage shift component shifts the input voltage to a lower level to charge the inductor. The discharging branch is coupled to the inductor when the inductor is discharged.

9 Claims, 4 Drawing Sheets

BUCK CONVERTER WITH HIGH POWER EFFICIENCY

CROSS REFERENCE TO RELATED APPLICATIONS

This application claims the benefit of U.S. Provisional Application No. 63/282,209 filed Nov. 23, 2021, the entirety of which is incorporated by reference herein.

BACKGROUND OF THE INVENTION

Field of the Invention

The present invention relates to buck converters.

Description of the Related Art

A buck converter steps down voltage from an input voltage (supply) to an output voltage (load). It is a class of switched-mode power supply (SMPS), and typically uses an inductor as an energy storage element.

In a traditional inductor-based buck converter operating at a high conversion rate (e.g., 4V-to-1V), the dominant power loss is the switching loss (CV2F). The high input voltage (e.g., 4V) results in significant switching loss. In addition to the switching loss, the conduction loss (IR2) should also be taken into consideration in the design of a buck converter.

A buck converter with high power efficiency is called for.

BRIEF SUMMARY OF THE INVENTION

A buck converter with high power efficiency is proposed.

In an exemplary embodiment, a buck converter converting an input voltage to an output voltage has an inductor, a voltage shift component, and a discharging branch. The inductor is charged and discharged to regulate the output voltage. The voltage shift component shifts the input voltage to a lower level to charge the inductor. The discharging branch is coupled to the inductor when the inductor is discharged.

Because of the voltage shift component, the switching loss (CV2F) is significantly suppressed by the lower operating voltages supplied to the parasitic capacitors.

Because of the discharging branch, the total current on the circuit is suppressed, and the conduction loss (IR2) is significantly suppressed.

In an exemplary embodiment, the buck converter has a first switch. When being turned on, the first switch couples the input voltage to a first terminal of the voltage shift component. The voltage shift component has a second terminal coupled to the first terminal of the inductor. The inductor has a second terminal coupled to the output terminal of the buck converter that provides the output voltage.

In an exemplary embodiment, the buck converter has a second switch and a third switch. When being turned on, the second switch couples the first terminal of the inductor to ground. When being turned on, the third switch couples the output terminal of the buck converter to the first terminal of the voltage shift component.

In an exemplary embodiment, the first switch is turned on in the charging phase of the inductor, and the second switch and the third switch are turned on in the discharging phase of the inductor.

In an exemplary embodiment, the voltage shift provided by the voltage shift component to lower the input voltage is set during the discharging phase of the inductor.

In an exemplary embodiment, the voltage shift component is a capacitor.

In an exemplary embodiment, the output terminal of the buck converter is directly coupled to the capacitor through the third switch during the discharging phase of the inductor.

In an exemplary embodiment, during the discharging phase of the inductor, the capacitor is charged to store the output voltage as the voltage shift.

In an exemplary embodiment, the buck converter has a voltage shift setting circuit, converting the output voltage of the buck converter to the expected voltage used in charging the capacitor during the discharging phase of the inductor, for the capacitor to provide the voltage shift during the charging phase of the inductor.

In an exemplary embodiment, the expected voltage is coupled to the capacitor through the third switch during the discharging phase of the inductor.

In an exemplary embodiment, the expected voltage is b times the output voltage, where b is a number.

In an exemplary embodiment, the expected voltage is b times the output voltage plus c, where b and c are two numbers.

In an exemplary embodiment, the first switch is a p-channel metal oxide semiconductor transistor, and the second switch and the third switch are n-channel metal oxide semiconductor transistors.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
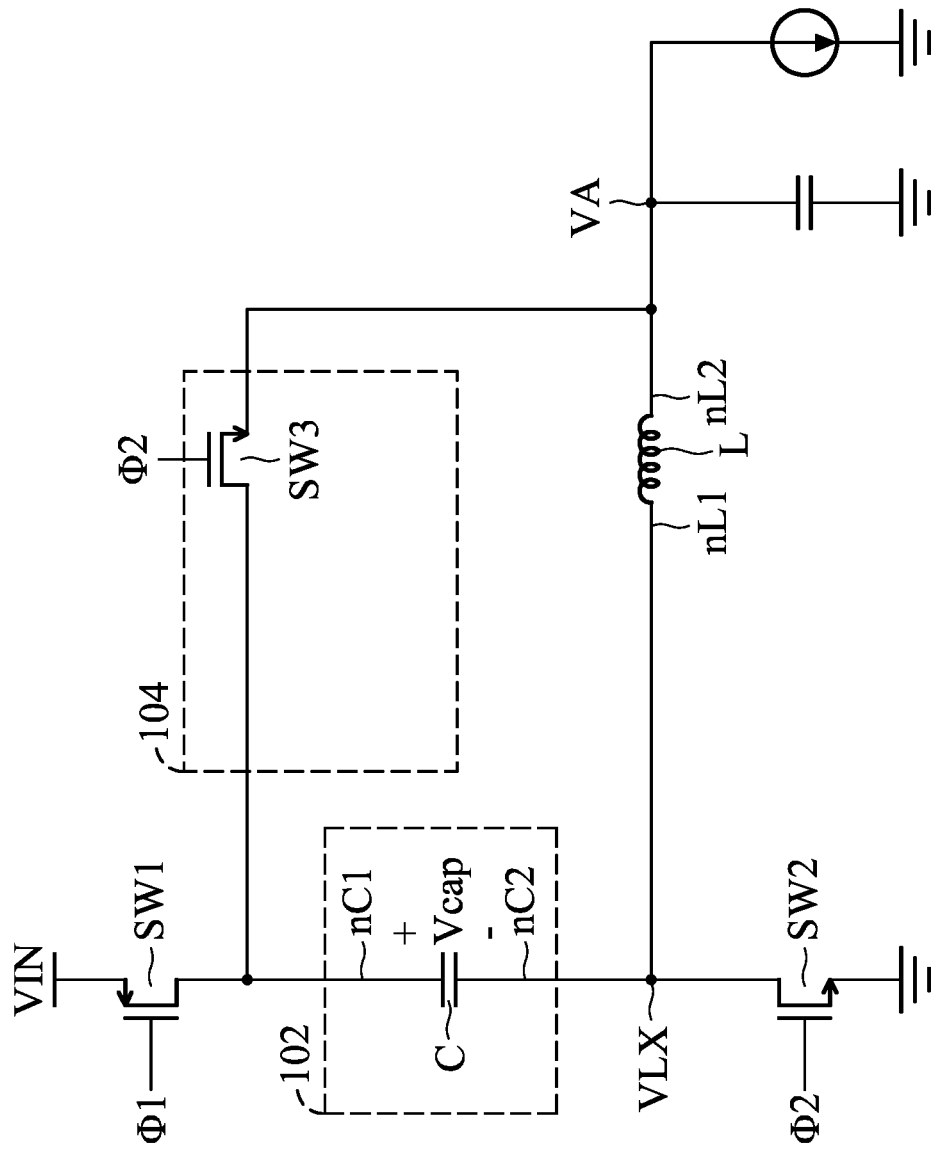
FIG. 1 shows a buck converter 100 in accordance with an exemplary embodiment of the present invention.

FIG. 1 shows a buck converter 100 in accordance with an exemplary embodiment of the present invention.

The buck converter 100 converting an input voltage VIN to an output voltage VA has an inductor L, a voltage shift component 102, and a discharging branch 104. The inductor L is charged and discharged to regulate the output voltage VA. The voltage shift component 102 shifts the input voltage VIN to a lower level VLX to charge the inductor L. The discharging branch 104 is coupled to the inductor L when the inductor L is discharged.

Because of the voltage shift component 102, the switching loss (CV2F) is significantly suppressed by the lower operating voltages supplied to the parasitic capacitors. In FIG. 1, the voltage shift component 102 is a capacitor C, which can be replaced by any component capable of voltage shifting.

Because of the discharging branch 104, the total current on the circuit is suppressed, and the conduction loss (IR2) is significantly suppressed.

The voltage shift component 102 also suppresses the voltage ripple of VLX, which is suppressed from VIN to (VIN-VA). Therefore, the inductor current ripple is also suppressed, which further suppresses the inductor ACR loss.

The details of the buck converter 100 are described in the following paragraphs.

As shown, the buck converter 100 has a first switch SW1. In the buck converter 100, the first switch SW1 is a p-channel metal oxide semiconductor (PMOS) transistor but not limited thereto. When being turned on, the first switch SW1 couples the input voltage VIN to a first terminal nC1 of the voltage shift component 102. The voltage shift component 102 has a second terminal nC2 coupled to a first terminal nL1 of the inductor L. The inductor L has a second terminal nL2 that is coupled to the output terminal of the buck converter 100 that provides the output voltage VA.

The buck converter 100 has a second switch SW2 and a third switch SW3. In the buck converter 100, the second switch SW2 and the third switch SW3 are n-channel metal oxide semiconductor (NMOS) transistors but not limited thereto. When being turned on, the second switch SW2 couples the first terminal nL1 of the inductor L to ground (GND). As for the third switch SW3, the turned-on third switch SW3 couples the output terminal (VA) of the buck converter 100 to the first terminal nC1 of the voltage shift component 102.

In an exemplary embodiment, the first switch SW1 is turned on in a charging phase Φ1 of the inductor L, and the second switch SW2 and the third switch SW3 are turned on in a discharging phase Φ2 of the inductor L. In an exemplary embodiment, when the first switch SW1 is turned on in the charging phase Φ1 of the inductor L, the second and third switches SW2 and SW3 are turned off. When the second and third switches SW2 and SW3 are turned on in the discharging phase Φ2 of the inductor L, the first switch SW1 is turned off.

During the discharging phase Φ2 of the inductor L, a voltage shift Vcap provided by the voltage shift component 102 to lower the input voltage VIN is set. In this example, the voltage shift Vcap is set to VA during the discharging phase Φ2 of the inductor L.

Figure 2A:
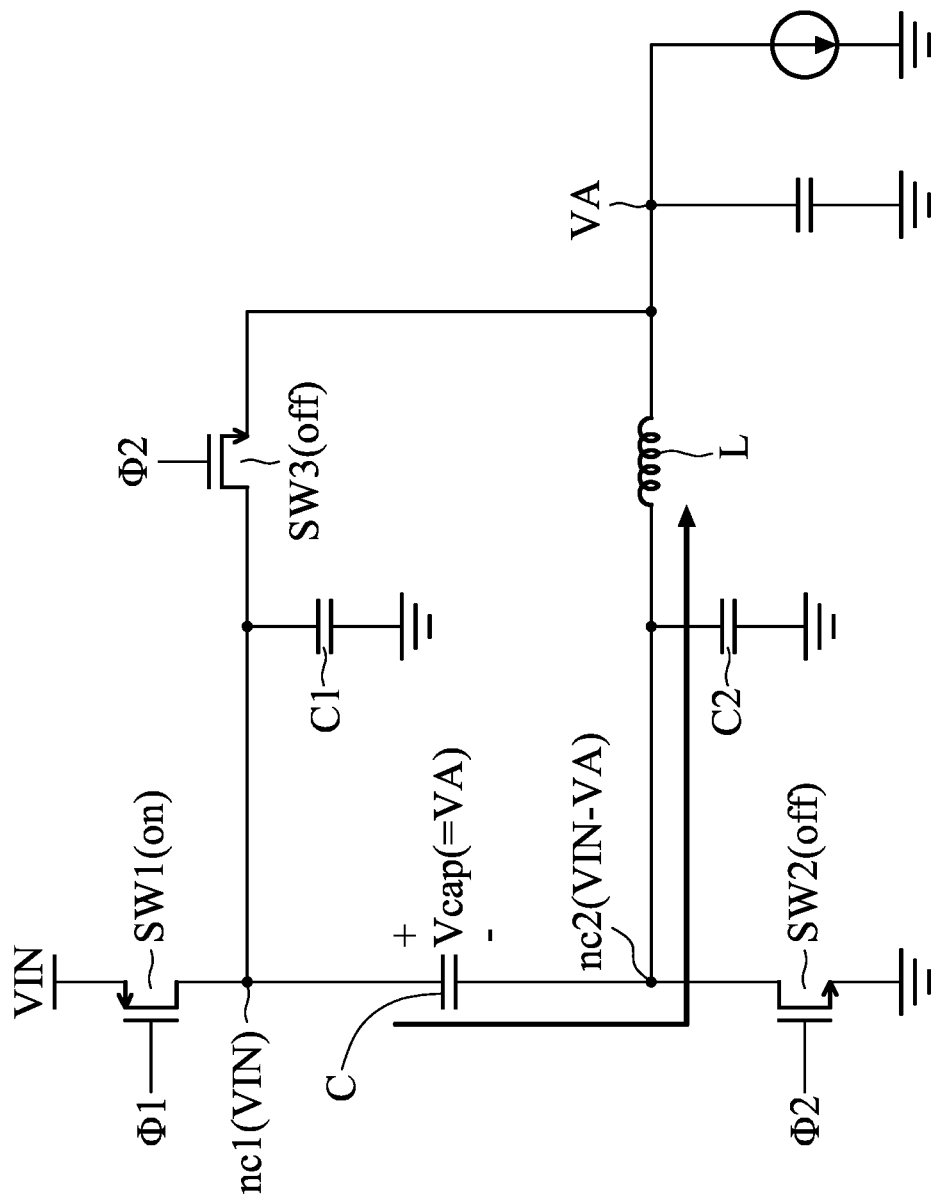
FIG. 2A illustrates the charging phase (Φ1) of the inductor L.

FIG. 2A illustrates the charging phase (Φ1) of the inductor L. The first switch SW1 is turned on (Φ1), and the voltage shift component 102 and the inductor L form a voltage divider between the input terminal (VIN) of the buck converter 100 and the output terminal (VA) of the buck converter 100. While a voltage VIN is supplied to a parasitic capacitor C1 at the terminal nc1, a divided voltage (VIN-VA) is supplied to a parasitic capacitor C2 at the terminal nc2.

Figure 2B:
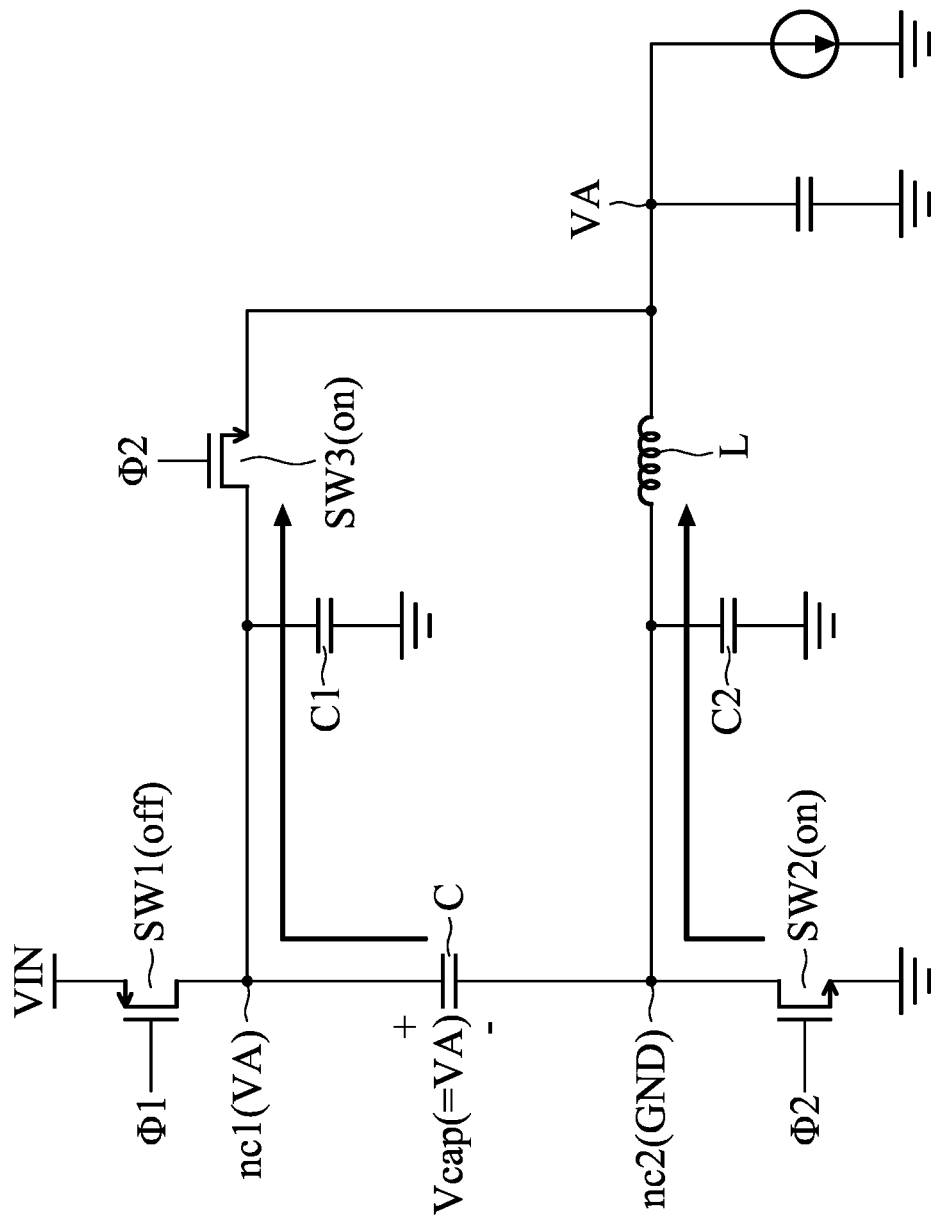
FIG. 2B illustrates the discharging phase (Φ2) of the inductor L.

FIG. 2B illustrates the discharging phase (Φ2) of the inductor L. The second and third switches SW2 and SW3 are turned on (Φ2), and the current flowing through the inductor L is reduced by the branch current flowing through the turned-on third switch SW3. The terminal nc1 (having the parasitic capacitor C1) is at the output voltage VA because of the turned-on third switch SW3. The terminal nc2 (having the parasitic capacitor C2) is at the ground voltage GND because of the turned-on second switch SW2. The capacitor C is charged to store the voltage (VA-GND) as the voltage shift Vcap required in the charging phase (Φ1) of the inductor L.

In this design, the voltage swing on the parasitic capacitor C1 is VIN~VA, and the voltage swing on the parasitic capacitor C2 is (VIN-VA)~GND. The switching loss ($CV^2F$) is:

$$C1(VIN-VA)^2F+C2(VIN-VA-GND)^2F,$$

which is $(C1+C2)(VIN-VA)^2F$. $(VIN-VA)^2$ is usually much lower than $VIN^2$. The switching loss ($CV^2F$) is significantly suppressed.

For example, when the input voltage VIN is 4V and output voltage VA is 1V, $(VIN-VA)^2$ is 9, much lower than $VIN^2$ that is 16. In comparison with the conventional buck converters, the power efficiency of the buck converter 100 is considerably improved by the suppressed switching loss.

As for the conduction loss (IR2), it is:

$$(IL*D)^2*Rp+(IL*(1-D))^2*Rn1+Ic^2*Rn2+IL^2*RDC$$

where IL is the current through the inductor L, D is the duty cycle of the charging/discharging of the inductor L, Ic is the current through the capacitor C, Rp is the parasitic resistor of the first switch SW1 (a PMOS transistor), Rn1 is the parasitic resistor of the second switch SW2 (an NMOS transistor), Rn2 is the parasitic resistor of the third switch SW3 (another NMOS transistor), and RDC is the equivalent resistance of the inductor L. Because of the discharging branch design, the current Ic and IL in the last two terms of the conduction loss function are considerably suppressed, and the conduction loss is significantly suppressed.

In this design, the conventional inductor current is divided into the current Ic and the current IL, For example, the current Ic and the current IL each may be just half the conventional inductor current. Thus, the conduction power is recued to $(1/2)^2+(1/2)^2$, half the conventional conduction loss.

Furthermore, the duty cycle D of the buck converter 100 is discussed in this paragraph. To operate the buck converter 100, the duty cycle D should be set to VA/(VIN-VA). A conventional buck converter without the voltage divider design usually operates at a duty cycle VA/VIN. For a 4V-to-1V conversion, the duty cycle of the buck converter 100 is 1/3, which results in a better power efficiency than a conventional buck converter with a duty cycle 1/4.

The power efficiency of the present invention is obviously much better than conventional buck conversion circuits.

In the forgoing example, the output terminal (VA) of the buck converter 100 is directly coupled to the capacitor C through the third switch SW3 during the discharging phase (Φ2) of the inductor L to charge the capacitor C to store the output voltage VA as the voltage shift Vcap required in the charging phase (Φ2) of the inductor L. In some other exemplary embodiments, the capacitor C may be charged to store another voltage as the voltage shift Vcap.

Figure 3:
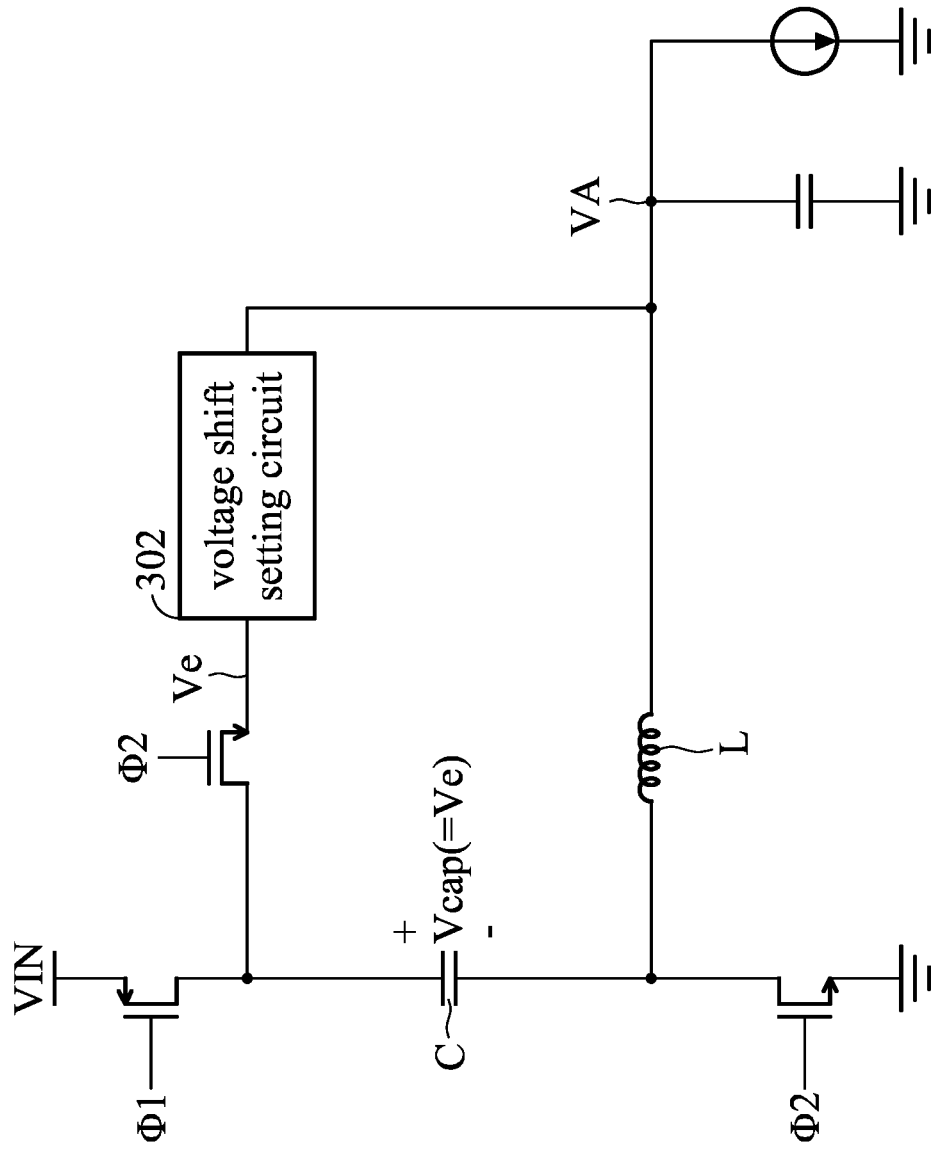
FIG. 3 illustrates a buck converter 300 in accordance with another exemplary embodiment of the present invention.

FIG. 3 illustrates a buck converter 300 in accordance with another exemplary embodiment of the present invention.

The buck converter 300 has a voltage shift setting circuit 302, converting the output voltage VA of the buck converter 300 to the expected voltage Ve used in charging the capacitor C during the discharging phase Φ2 of the inductor L. Thus, during the charging phase Φ1 of the inductor L, the capacitor C provides Ve (=Ve-GND) as the voltage shift Vcap.

In an exemplary embodiment, the expected voltage Ve is b times the output voltage VA, where b is a number. Ve=b*VA. For example, b may be 2.

In an exemplary embodiment, the expected voltage Ve is b times the output voltage VA plus c, where b and c are two numbers. Ve=b*VA+c.

In another exemplary embodiment, the voltage shift setting circuit 302 may generate the expected voltage Ve based on the output voltage VA in a non-linear way.

Any circuit generating the expected voltage Ve based on the output voltage VA may be used to implement the voltage shift setting circuit 302.

In the forgoing exemplary embodiments, the voltage shift component is implemented by a capacitor C. Such a buck converter can be named a series cap-inductor buck converter. However, the voltage shift component is not limited the single capacitor C illustrated in the figures.

Note that the proposed buck converter does not add too much switches in its circuit. In comparison with other buck converters using a considerable number of switches, the proposed buck converter using the limited number of switches indeed suppresses the switching loss and does not need a complex circuit design.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A buck converter converting an input voltage to an output voltage, comprising:
    an inductor, charged and discharged to regulate the output voltage;
    a voltage shift component, implemented by a capacitor for shifting the input voltage to a lower level to charge the inductor;
    a discharging branch, coupled to the inductor during a discharging phase of the inductor; and
    a voltage shift setting circuit, converting the output voltage of the buck converter to an expected voltage used in charging the capacitor during the discharging phase of the inductor, for the capacitor to provide the voltage shift during a charging phase of the inductor.

2. The buck converter as claimed in claim 1, further comprising:
    a first switch, coupling the input voltage to a first terminal of the voltage shift component when being turned on;
    wherein:
    the voltage shift component has a second terminal coupled to a first terminal of the inductor; and
    the inductor has a second terminal coupled to an output terminal of the buck converter that provides the output voltage.

3. The buck converter as claimed in claim 2, further comprising:
    a second switch, coupling the first terminal of the inductor to ground when being turned on.

4. The buck converter as claimed in claim 3, further comprising:
    a third switch, coupling the expected voltage to the first terminal of the voltage shift component when being turned on.

5. The buck converter as claimed in claim 4, wherein:
    the first switch is turned on in the charging phase of the inductor; and
    the second switch and the third switch are turned on in the discharging phase of the inductor.

6. The buck converter as claimed in claim 5, wherein:
    the voltage shift provided by the voltage shift component to lower the input voltage is set during the discharging phase of the inductor.

7. The buck converter as claimed in claim 1, wherein:
    the expected voltage is b times the output voltage, where b is a number.

8. The buck converter as claimed in claim 1, wherein:
    the expected voltage is b times the output voltage plus c, where b and c are two numbers.

9. The buck converter as claimed in claim 5, wherein:
    the first switch is a p-channel metal oxide semiconductor transistor; and
    the second switch and the third switch are n-channel metal oxide semiconductor transistors.

* * * * *